United States Patent
Yu (10) Patent No.: US 12,501,250 B2
(45) Date of Patent: Dec. 16, 2025

(54) MULTI-DEVICE COMMUNICATION METHOD, ELECTRONIC DEVICE, AND COMPUTER-READABLE STORAGE MEDIUM

(71) Applicant: HUAWEI TECHNOLOGIES CO., LTD., Shenzhen (CN)

(72) Inventor: Jiaxin Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 394 days.

(21) Appl. No.: 18/255,058

(22) PCT Filed: Nov. 27, 2021

(86) PCT No.: PCT/CN2021/133753
§ 371 (c)(1),
(2) Date: May 30, 2023

(87) PCT Pub. No.: WO2022/111662
PCT Pub. Date: Jun. 2, 2022

(65) Prior Publication Data
US 2024/0098476 A1    Mar. 21, 2024

(30) Foreign Application Priority Data
Nov. 30, 2020  (CN) .......................... 202011381362.1

(51) Int. Cl.
*H04W 8/00*    (2009.01)
*H04W 52/02*   (2009.01)
*H04W 76/10*   (2018.01)

(52) U.S. Cl.
CPC .......... *H04W 8/005* (2013.01); *H04W 76/10* (2018.02); *H04W 52/0251* (2013.01)

(58) Field of Classification Search
None
See application file for complete search history.

(56) References Cited

U.S. PATENT DOCUMENTS

| 2014/0365580 | A1* | 12/2014 | Azenkot | G06F 3/0346 |
| | | | | 709/205 |
| 2015/0350022 | A1* | 12/2015 | Lee | H04L 61/5046 |
| | | | | 709/226 |
| 2024/0179615 | A1* | 5/2024 | Iura | G06F 9/541 |

FOREIGN PATENT DOCUMENTS

| CN | 106507282 A | 3/2017 |
| CN | 108882337 A | 11/2018 |
| EP | 4311282 A1 | 1/2024 |

* cited by examiner

*Primary Examiner* — Robert M Morlan
(74) *Attorney, Agent, or Firm* — Leydig, Voit & Mayer, Ltd.

(57) ABSTRACT

A multi-device communication method, an electronic device, and a computer-readable storage medium are provided. According to the method, Bluetooth connection authorization is implemented between electronic devices by group accounts, a data transmission function is implemented by a shared device on behalf of each electronic device, and a data transmission manner can be switched as required to reduce power consumption. Therefore, the electronic device achieves an excellent power saving effect, a battery life of the electronic device is prolonged, and user experience is improved.

19 Claims, 11 Drawing Sheets

MULTI-DEVICE COMMUNICATION METHOD, ELECTRONIC DEVICE, AND COMPUTER-READABLE STORAGE MEDIUM

CROSS-REFERENCE TO RELATED APPLICATIONS

This application is a National Stage of International Application No. PCT/CN2021/133753, filed on Nov. 27, 2021, which claims priority to Chinese Patent Application No. 202011381362.1, filed on Nov. 30, 2020, both of which are hereby incorporated by reference in their entireties.

TECHNICAL FIELD

Embodiments of this application relate to the field of wireless communication technologies, and in particular, to a multi-device communication method, an electronic device, and a computer-readable storage medium.

BACKGROUND

An electronic device may transmit wireless data by using a wireless communication technology. Common data communication technologies include a general packet radio service (GPRS) cellular technology, a wireless fidelity (Wi-Fi) technology, and a Bluetooth technology. The Bluetooth communication technology is only applied to end-to-end transmission due to limitations such as a transmission speed and a distance.

In the night-time, to maintain a connection between the electronic device and a cloud server, the electronic device also periodically performs data communication. However, the data communication performed by the electronic device causes high power consumption. Therefore, a battery life of the electronic device is shortened.

SUMMARY

Embodiments of this application provide a multi-device communication method, an electronic device, and a computer-readable storage medium. According to embodiments of this application, the electronic device can achieve an excellent power saving effect, a battery life of the electronic device is prolonged, and user experience is improved.

According to a first aspect, an embodiment of this application provides a multi-device communication method, applied to a first electronic device, where the multi-device communication method includes: scanning a second electronic device around the first electronic device through Bluetooth if the first electronic device needs to connect to a network and is in a charging state; if the scanned second electronic device belongs to a same group, determining whether the scanned second electronic device has a shared device; and if the scanned second electronic device has no shared device, using the first electronic device as the shared device, and establishing a Bluetooth connection to the second electronic device through Bluetooth.

According to the multi-device communication method in this embodiment of this application, Bluetooth connection authorization is implemented between electronic devices by group accounts, a data transmission function is implemented by a shared device on behalf of each electronic device, and a data transmission manner can be switched as required to reduce power consumption. Therefore, the electronic device achieves an excellent power saving effect, a battery life of the electronic device is prolonged, and user experience is improved.

With reference to the first aspect, in a possible implementation, if the scanned second electronic device has a shared device, the shared device is connected through Bluetooth.

Based on such a design, a data transmission function is implemented by the shared device on behalf of each electronic device, and a data transmission manner can be switched as required to reduce power consumption. Therefore, the electronic device achieves an excellent power saving effect, a battery life of the electronic device is prolonged, and user experience is improved.

With reference to the first aspect, in a possible implementation, before the scanning a second electronic device around the first electronic device through Bluetooth if the first electronic device is connectable to a network and is in a charging state, the method further includes: determining, based on state information of the first electronic device, whether the first electronic device enters an idle state; obtaining device information of the first electronic device if the first electronic device enters the idle state; and determining, based on the device information, whether the first electronic device is connectable to the network and is in the charging state. Based on such a design, a use scenario of the electronic device may be identified without affecting user experience.

With reference to the first aspect, in a possible design, the state information of the first electronic device includes screen-off duration, a perceptible service, a persistent connection state, a device occlusion state, and a movement state. Based on such a design, the use scenario of the electronic device may be identified without affecting user experience.

With reference to the first aspect, in a possible implementation, after the scanning a second electronic device around the first electronic device by using a Bluetooth technology, the method further includes: obtaining a media access control address of the second electronic device; and determining, based on the media access control address of the second electronic device, whether the second electronic device and the first electronic device belong to the same group. Based on such a design, it may be determined, based on the obtained media access control address, whether the electronic devices belong to a same group. In other words, Bluetooth connection authorization may be implemented between the electronic devices by group accounts.

According to a second aspect, an embodiment of this application further provides a multi-device communication method, applied to a second electronic device, where the multi-device communication method includes: if the second electronic device needs to connect to a network and is in a non-charging state, scanning a first electronic device around the second electronic device through Bluetooth; if the scanned first electronic device belongs to a same group, determining whether the scanned first electronic device has a shared device; and if the scanned first electronic device has a shared device, establishing a Bluetooth connection to the shared device through Bluetooth.

According to the multi-device communication method in this embodiment of this application, Bluetooth connection authorization is implemented between electronic devices by group accounts, a data transmission function is implemented by a shared device on behalf of each electronic device, and a data transmission manner can be switched as required to reduce power consumption. Therefore, the electronic device achieves an excellent power saving effect, a battery life of the electronic device is prolonged, and user experience is improved.

With reference to the second aspect, in a possible implementation, the multi-device communication method further includes: if the second electronic device establishes the Bluetooth connection to the shared device, turning off a data switch and a Wi-Fi switch of the second electronic device, and performing data transmission through a Bluetooth protocol. Based on such a design, a data transmission manner can be switched as required to reduce power consumption. Therefore, the electronic device achieves an excellent power saving effect, a battery life of the electronic device is prolonged, and user experience is improved.

With reference to the second aspect, in a possible implementation, before the scanning a first electronic device around the second electronic device through Bluetooth, the method further includes: determining, based on state information of the second electronic device, whether the second electronic device enters an idle state; and obtaining device information of the second electronic device if the second electronic device enters the idle state. Based on such a design, a use scenario of the electronic device may be identified without affecting user experience.

With reference to the second aspect, in a possible implementation, the state information of the first electronic device includes screen-off duration, a perceptible service, a persistent connection state, a device occlusion state, and a movement state.

With reference to the second aspect, in a possible implementation, after scanning the second electronic device around the first electronic device through Bluetooth, the method further includes: obtaining a media access control address of the first electronic device; and determining, based on the media access control address of the first electronic device, whether the first electronic device and the second electronic device belong to the same group. Based on such a design, it may be determined, based on the obtained media access control address, whether the electronic devices belong to a same group. In other words, Bluetooth connection authorization may be implemented between the electronic devices by group accounts.

With reference to the second aspect, in a possible implementation, if a time period in which the second electronic device is in the idle state is less than a first time period, the first electronic device around the second electronic device is scanned at an interval of a second time period. Based on such a design, power consumption of the Bluetooth scanning of the electronic device is reduced, to achieve an objective of power saving.

With reference to the second aspect, in a possible implementation, if the time period in which the second electronic device is in the idle state is greater than or equal to the first time period, the first electronic device around the second electronic device is scanned at an interval of a third time period, where the third time period is greater than the second time period. Based on such a design, power consumption of the Bluetooth scanning of the electronic device is reduced, to achieve an objective of power saving.

According to a third aspect, an embodiment of this application further provides an electronic device, where the electronic device includes a memory and a processor, and the processor is configured to execute a computer program stored in the memory, to implement the foregoing multi-device communication method. According to this embodiment of this application, Bluetooth connection authorization is implemented between electronic devices by group accounts, a data transmission function is implemented by a shared device on behalf of each electronic device, and a data transmission manner can be switched as required to reduce power consumption. Therefore, the electronic device achieves an excellent power saving effect, a battery life of the electronic device is prolonged, and user experience is improved.

According to a fourth aspect, an embodiment of this application further provides a computer-readable storage medium, storing a computer program, where when the computer program is executed by a processor, the foregoing multi-device communication method is implemented.

According to the multi-device communication method, the electronic device, and the computer-readable storage medium provided in embodiments of this application, Bluetooth connection authorization is implemented between electronic devices by group accounts, a data transmission function is implemented by a shared device on behalf of each electronic device, and a data transmission manner can be switched as required to reduce power consumption. Therefore, the electronic device achieves an excellent power saving effect, a battery life of the electronic device is prolonged, and user experience is improved.

BRIEF DESCRIPTION OF DRAWINGS

FIG. 6A to FIG. 6C are a diagram of an application environment of a multi-device communication method according to an embodiment of this application;

| Description of main component symbols | |
|---|---|
| First electronic device | 100 |
| Memory | 101, 201 |
| Processor | 102, 202 |
| Second electronic device | 200 |
| Cloud server | 300 |

This application is further described in detail through the following implementations with reference to the foregoing accompanying drawings.

DESCRIPTION OF EMBODIMENTS

To make the objectives, technical solutions, and advantages of embodiments of this application clearer, the following clearly and completely describes the technical solutions in embodiments of this application with reference to accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

The term "and/or" in this application describes an association relationship between associated objects and represents that three relationships may exist. For example, A and/or B may represent the following three cases: Only A exists, both A and B exist, and only B exists. The character "/" in this specification indicates an "or" relationship between the associated objects. For example, A/B represents A or B.

In embodiments of this application, words such as "first" and "second" are merely for distinguishing between different objects, but cannot be understood as indicating or implying relative importance, and cannot be understood as indicating or implying a sequence. For example, a first application, a second application, and the like are for distinguishing between different applications, but are not for describing a specific sequence of applications. A feature defined by "first" or "second" may explicitly or implicitly include one or more of the features.

In the descriptions of embodiments of this application, the word such as "example" or "for example" is for representing giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner.

Figure 1:
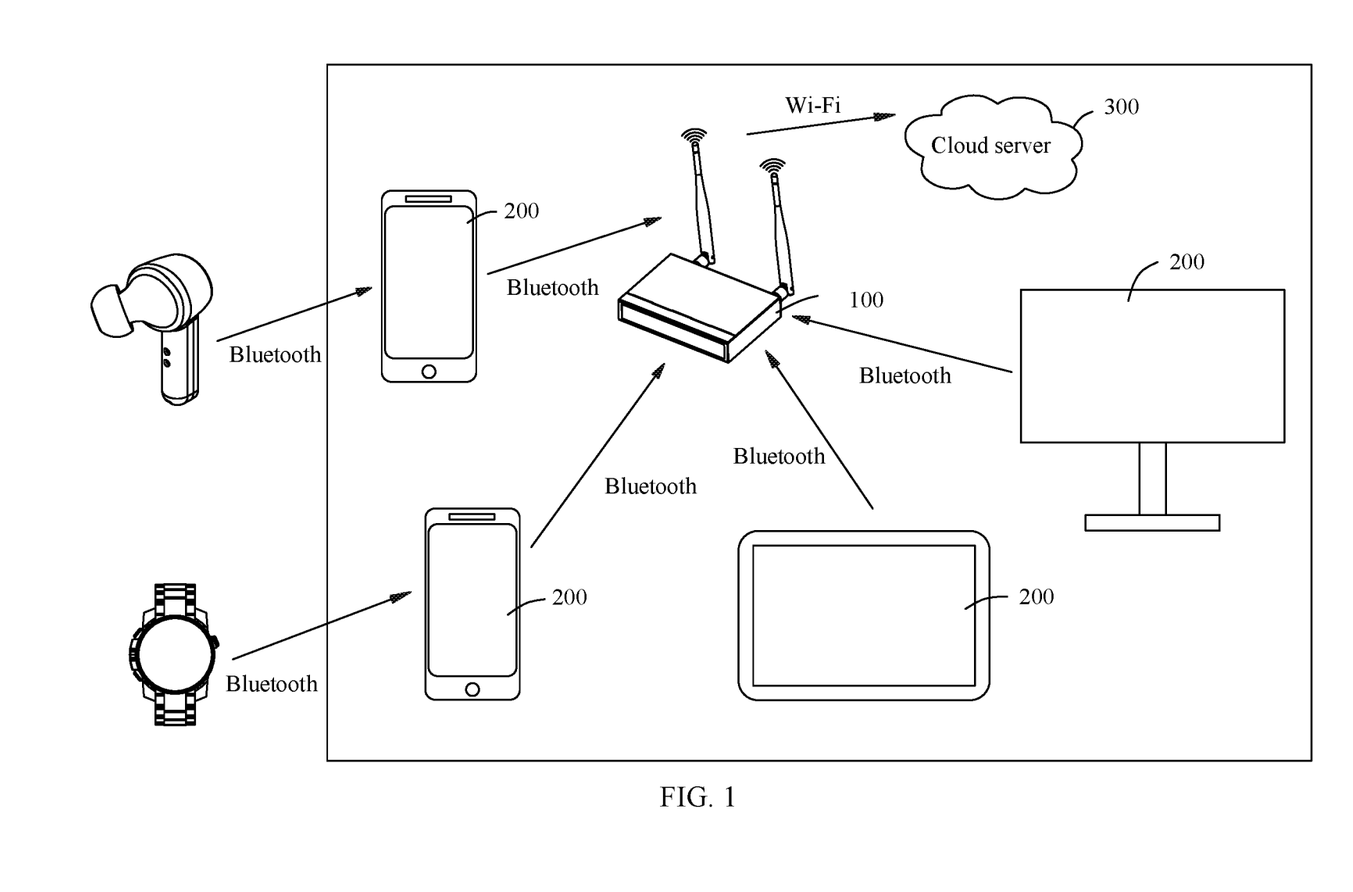
FIG. 1 is an architectural diagram of an application environment of a multi-device communication method according to an embodiment of this application.

FIG. 1 is a schematic architectural diagram of an application environment of a multi-device communication method according to an embodiment of this application.

The multi-device communication method in this application may be applied to an environment including one or more electronic devices, for example, an environment including a first electronic device 100, a second electronic device 200, and a cloud server 300.

The first electronic device 100 may establish a connection to the second electronic device 200 by using a short-range wireless communication technology. For example, the first electronic device 100 may establish a communication connection to the second electronic device 200 through Bluetooth. The first electronic device 100 may establish a communication connection to the cloud server 300 by Wi-Fi.

In this embodiment, the first electronic device 100 and the second electronic device 200 each may be a device that can automatically perform numerical calculation and/or information processing according to preset or pre-stored instructions. Hardware of the device includes but is not limited to a microprocessor, an application-specific integrated circuit (ASIC), a field programmable gate array (FPGA), a digital signal processor (DSP), an embedded device, and the like.

A plurality of electronic devices may share a network with each other through a Bluetooth protocol. Therefore, in a scenario of this application, the first electronic device 100 is in a charging state and is connectable to the network, and the second electronic device 200 is in a non-charging state and needs to connect to the network. Therefore, the first electronic device 100 may be used as a shared device, and perform data transmission with the second electronic device 200 through a Bluetooth protocol. Therefore, in embodiments of this application, data transmission is performed between the plurality of electronic devices through Bluetooth, and a data transmission manner through Wi-Fi or a GPRS cellular protocol is replaced. In this way, power consumption can be reduced.

Figure 2:
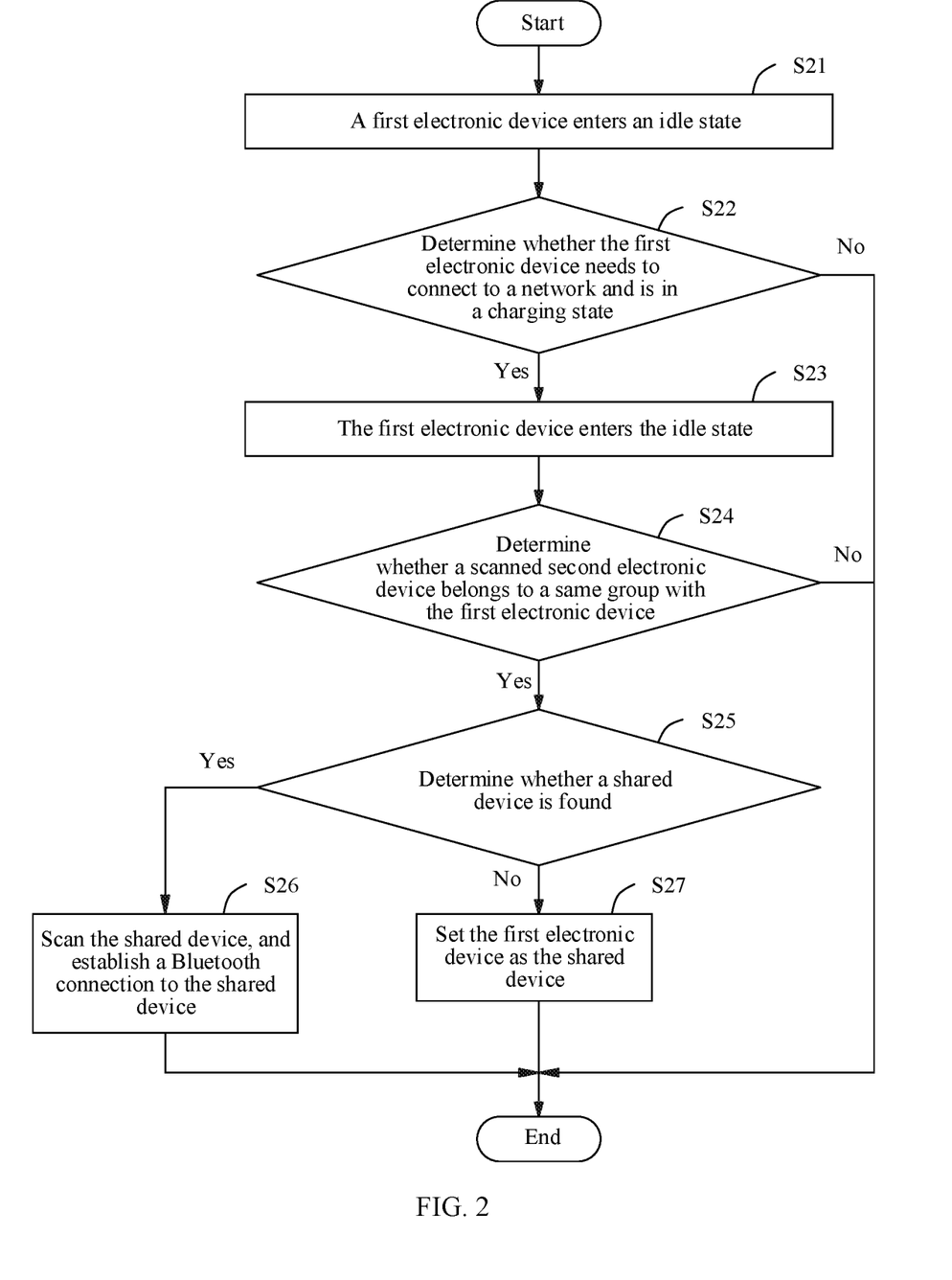
FIG. 2 is a flowchart of a multi-device communication method according to an embodiment of this application.

FIG. 2 is a flowchart of a multi-device communication method according to an embodiment of this application.

In this embodiment, the multi-device communication method may be applied to a first electronic device 100. For the first electronic device 100 that needs to perform multi-device communication, a multi-device communication function provided in the method in this application may be directly integrated into the first electronic device 100.

As shown in FIG. 2, the multi-device communication method specifically includes the following steps. A sequence of the steps in the flowchart may be changed based on different requirements, and some of the steps may be skipped.

Step S21: The first electronic device enters an idle state.

It may be understood that, a speed of data transmission through Bluetooth is low, and in this embodiment of this application, data transmission may be performed through Bluetooth when the first electronic device is in the idle state. Therefore, user experience of accessing the Internet is not affected.

Generally, a user uses an electronic device to access the Internet in the daytime. To avoid affecting user experience, a specific use scenario is determined in embodiments of this application. The user may not use the electronic device for a long time, and the first electronic device 100 is also in the idle state. It may be understood that the first electronic device 100 still receives and sends a data packet in the idle state. The data packet may be a heartbeat data packet that keeps a connection between the first electronic device 100 and a cloud server 300, or may be a data packet received and sent by an application (APP) of the first electronic device 100. Because the data packets do not need to be transmitted in real time, and the heartbeat packet is small, it is more suitable for these data packets to be transmitted through Bluetooth.

In an embodiment, there may be a plurality of determining manners for determining whether the first electronic device 100 has entered the idle state. For example, whether the first electronic device enters the idle state may be identified by identifying state information and an environment state of the first electronic device 100.

In this embodiment of this application, the first electronic device 100 may determine, based on the obtained state information, whether the first electronic device 100 enters the idle state.

Figure 3:
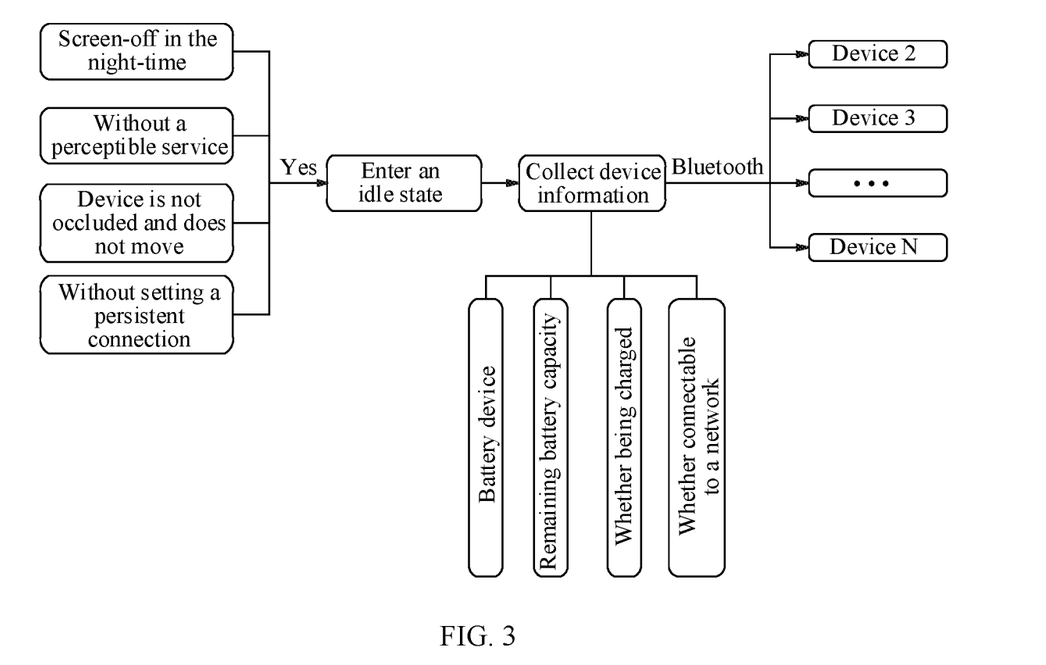
FIG. 3 is a schematic diagram of identification of an application scenario of a first electronic device according to an embodiment of this application.

For example, as shown in FIG. 3, the state information of the first electronic device 100 may include screen-off duration, a perceptible service, and a persistent connection state. The environment state of the first electronic device 100 may include an occlusion state and a movement state. In this embodiment, the perceptible service may be download, navigation, video or music playing, step counting, or the like.

It may be understood that the screen-off duration, the perceptible service, the persistent connection state, the occlusion state, and the movement state of the first electronic device 100 may all be used as one of conditions for determining whether the first electronic device 100 is in the idle state.

In a possible scenario, if the first electronic device 100 has screen-off duration which exceeds a threshold, has no perceptible service, is in a non-persistent connection state, is not occluded, and does not move, it may be determined that the first electronic device 100 enters the idle state in this case.

In some possible implementations, the first electronic device 100 may detect, by an optical proximity sensor, whether the first electronic device 100 is occluded. The first electronic device 100 may further sense environment luminance via an optical sensor.

Step S22: Determine whether the first electronic device is connectable to a network and is in a charging state. If the first electronic device is connectable to the network and is in the charging state, step S23 is performed; or if the first electronic device is not connectable to the network and is not in the charging state, the steps end.

As shown in FIG. 3, when the first electronic device 100 enters the idle state, the first electronic device 100 may collect device information. To be specific, the first electronic device 100 may read, through an interface of a framework layer, a battery state, a remaining battery capacity, whether being charged, whether connectable to the network, and the like of the first electronic device 100.

Therefore, after the first electronic device 100 enters the idle state, the first electronic device 100 determines, based on the obtained device information, whether the first electronic device 100 is connectable to the network. If the first electronic device 100 is connectable to the network and is in the charging state, the first electronic device 100 may be set as a shared device.

Step S23: Scan a surrounding electronic device.

In this embodiment of this application, the first electronic device 100 may turn on a Bluetooth switch, and scan the surrounding electronic device through Bluetooth.

Step S24: Determine whether a scanned second electronic device belongs to a same group. If the scanned second electronic device belongs to the same group, step S25 is performed; or if the scanned second electronic device does not belong to the same group, the steps end.

In this embodiment of this application, the first electronic device 100 obtains a media access control (MAC) address of the scanned second electronic device 200, and determines, based on the obtained MAC address, whether the second electronic device 200 and the first electronic device 100 belong to the same group. It may be understood that the same group may mean that IDs logged in to by a plurality of electronic devices are a same ID or belong to a same family and/or a same group.

Step S25: Determine whether a shared device is found. If the shared device is found, step S26 is performed; or if the shared device is not found, step S27 is performed.

In this embodiment of this application, the first electronic device 100 needs to determine whether a scanned electronic device already has a shared device.

Step S26: Set the first electronic device as the shared device.

If no shared device is found, in other words, the scanned electronic device has no shared device, the first electronic device sets the first electronic device as the shared device, and waits for a device to request a connection.

Step S27: Scan the shared device, and establish a Bluetooth connection to the shared device.

If the scanned electronic device already has a shared device, the first electronic device 100 establishes a Bluetooth connection to the shared device.

Figure 4:
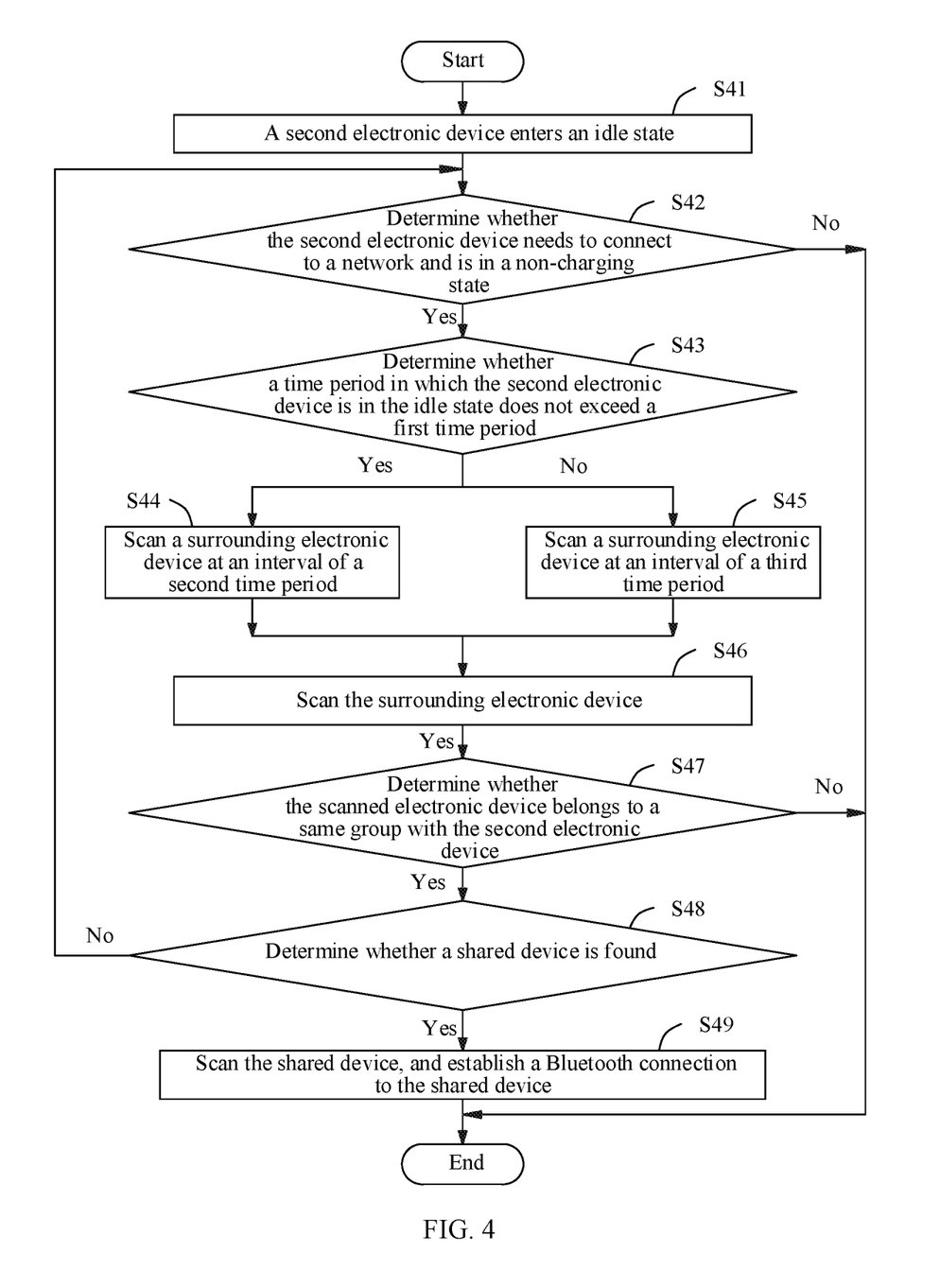
FIG. 4 is another flowchart of a multi-device communication method according to an embodiment of this application.

FIG. 4 is a flowchart of a multi-device communication method according to an embodiment of this application.

In this embodiment, the multi-device communication method may be applied to a second electronic device 200. For the second electronic device 200 that needs to perform multi-device communication, a multi-device communication function provided in the method in this application may be directly integrated into the second electronic device 200.

As shown in FIG. 4, the multi-device communication method specifically includes the following steps. A sequence of the steps in the flowchart may be changed based on different requirements, and some of the steps may be skipped.

Step S41: The second electronic device enters an idle state.

Figure 5:
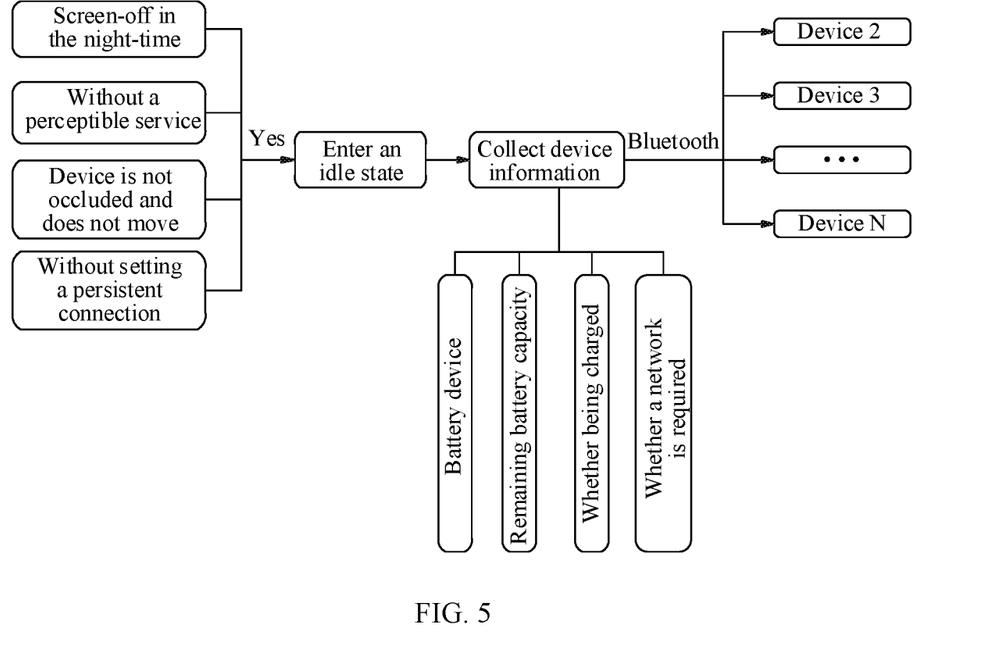
FIG. 5 is a schematic diagram of identification of an application scenario of a second electronic device according to an embodiment of this application.

For example, as shown in FIG. 5, state information of the second electronic device 200 may include screen-off duration, a perceptible service, and a persistent connection state. An environment state of the second electronic device 200 may include an occlusion state and a movement state.

In a possible scenario, if the second electronic device has screen-off duration which exceeds a threshold, has no perceptible service, is in a non-persistent connection state, is not occluded, and does not move, it may be determined that the second electronic device 200 enters the idle state in this case.

In some possible implementations, the second electronic device may further detect, via an optical proximity sensor, whether the second electronic device is occluded. The second electronic device may further sense environment luminance via an optical sensor.

Step S42: Determine whether the second electronic device needs to connect to a network and is in a non-charging state. If the second electronic device needs to connect to the network and is in the non-charging state, step S43 is performed; or if the second electronic device does not need to connect to the network and is not in the non-charging state, the steps end.

As shown in FIG. 5, after the second electronic device 200 enters the idle state, the second electronic device 200 may collect device information. To be specific, the second electronic device 200 may collect device information of the second electronic device 200, for example, a battery status, a remaining battery capacity, whether being charged, and whether needing to access the network.

Therefore, after the second electronic device enters the idle state, the second electronic device may determine, based on the obtained device information, whether the second electronic device needs to connect to the network and is in a charging state.

Step S43: Determine whether a time period in which the second electronic device is in the idle state does not exceed a first time period. If the time period does not exceed the first time period, step S44 is performed; or if the time period exceeds the first time period, step S45 is performed.

For the second electronic device that is not charged, whether the time period in which the second electronic device is in the idle state exceeds the first time period needs to be determined. It may be understood that, in this embodiment, the first time period may be half an hour, or may be one hour in another embodiment. This is not limited in this application.

Step S44: Scan a surrounding electronic device at an interval of a second time period.

For example, if the time period in which the second electronic device is in the idle state does not exceed the first time period, Bluetooth scanning is performed at an interval of the second time period. For example, the second electronic device may perform Bluetooth scanning every 5 minutes. It may be understood that the second electronic device sets off a non-wake-up alarm every 5 minutes. In other words, the second electronic device requests to start a system once every 5 minutes to perform Bluetooth scanning. If the system of the second electronic device is woken up by another service, the second electronic device performs Bluetooth scanning as the system is woken up, to reduce power consumption.

Step S45: Scan the surrounding electronic device at an interval of a third time period.

For example, if the time period in which the second electronic device is in the idle state has exceeded the first time period, the Bluetooth scanning is performed at an interval of a third time period. For example, the second electronic device may perform Bluetooth scanning every 30 minutes. For example, after the time period in which the second electronic device 200 is in the idle state exceeds half an hour, a quantity of times of scanning needs to be reduced because the first electronic device is not scanned for a long time and Bluetooth scanning wastes power.

Step S46: Scan the surrounding electronic device.

In this embodiment of this application, the second electronic device may turn on a Bluetooth switch, and scan the surrounding electronic device through Bluetooth.

Step S47: Determine whether the scanned electronic device belongs to a same group. If the scanned electronic device belongs to the same group, step S48 is performed; or if the scanned electronic device does not belong to the same group, the steps end.

In this embodiment of this application, the second electronic device 200 obtains a MAC address of the scanned electronic device, and determines, based on the obtained MAC address, whether the scanned electronic device and the second electronic device 200 belong to the same group.

Step S48: Determine whether a shared device is found. If the shared device is found, step S49 is performed; or if the shared device is not found, return to step S42.

In this embodiment of this application, the second electronic device 200 needs to determine whether the scanned electronic device has a shared device.

Step S49: Scan the shared device, and establish a Bluetooth connection to the shared device.

If the shared device is found, the second electronic device 200 connects to the shared device through Bluetooth. In addition, after connecting to the shared device, the second electronic device may disconnect Wi-Fi, and may enable a Wi-Fi chip to be powered off and turn off a Wi-Fi switch, so as to reduce power consumption of the second electronic device, and prolong a battery life of the second electronic device.

In this embodiment of this application, an electronic device may identify a use scenario of the electronic device, to determine whether to use Bluetooth to perform data communication on behalf of Wi-Fi or a GPRS cellular protocol. After the use scenario is determined, Bluetooth scanning is enabled at a framework layer, to obtain a MAC address of the electronic device. If the electronic device belongs to a same group, Bluetooth connection authorization may be performed, and functions such as data transmission and data scanning are performed by using Bluetooth on behalf of Wi-Fi and a modem. In addition, a system is enabled to turn off a switch of the Wi-Fi or the modem, so as to save power.

Figure 6A:
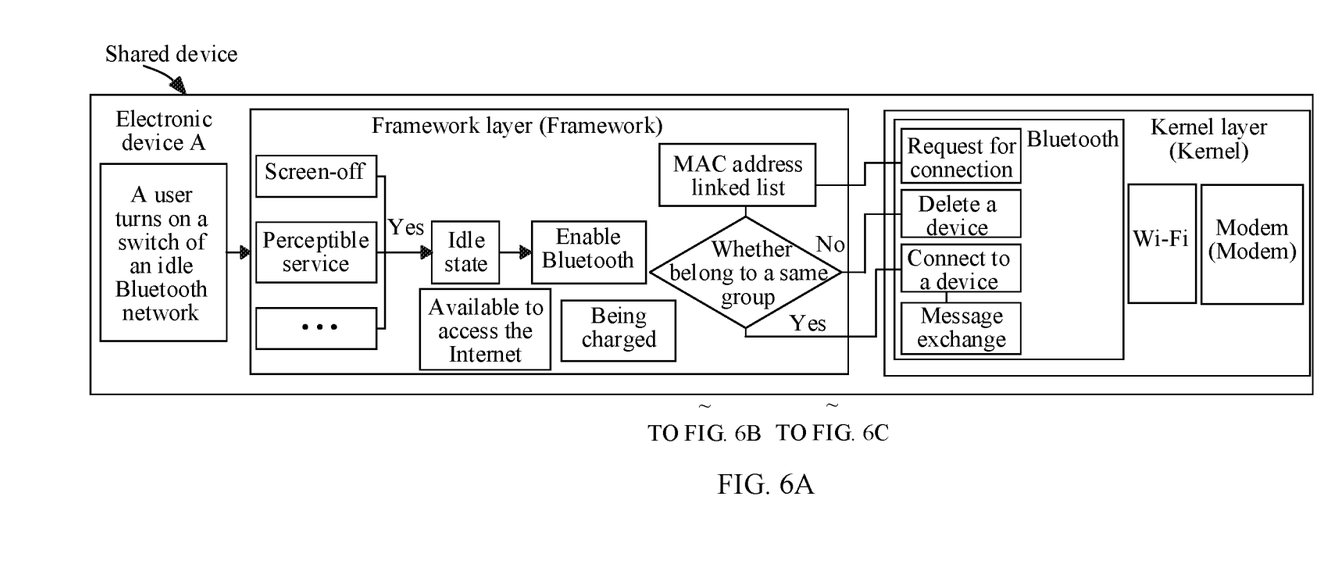
Figure 6B:
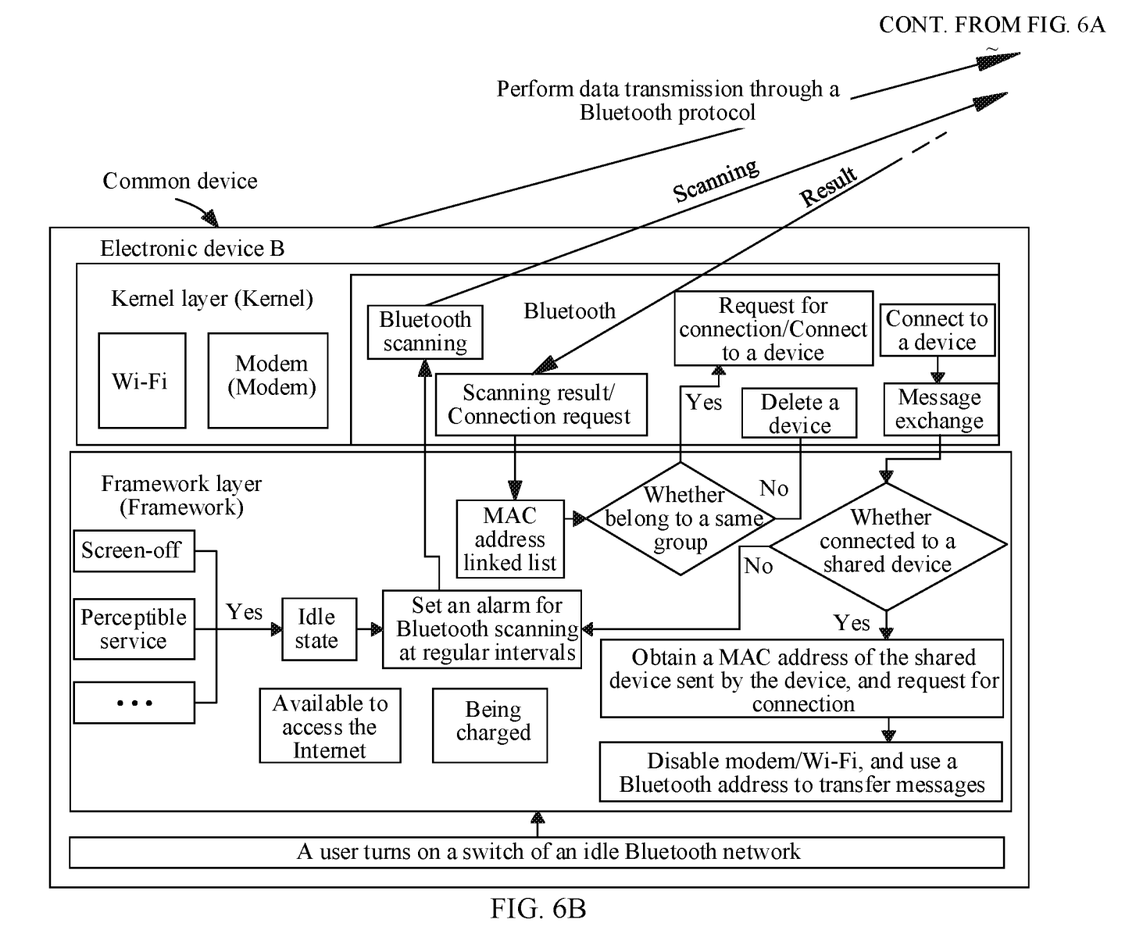
Figure 6C:
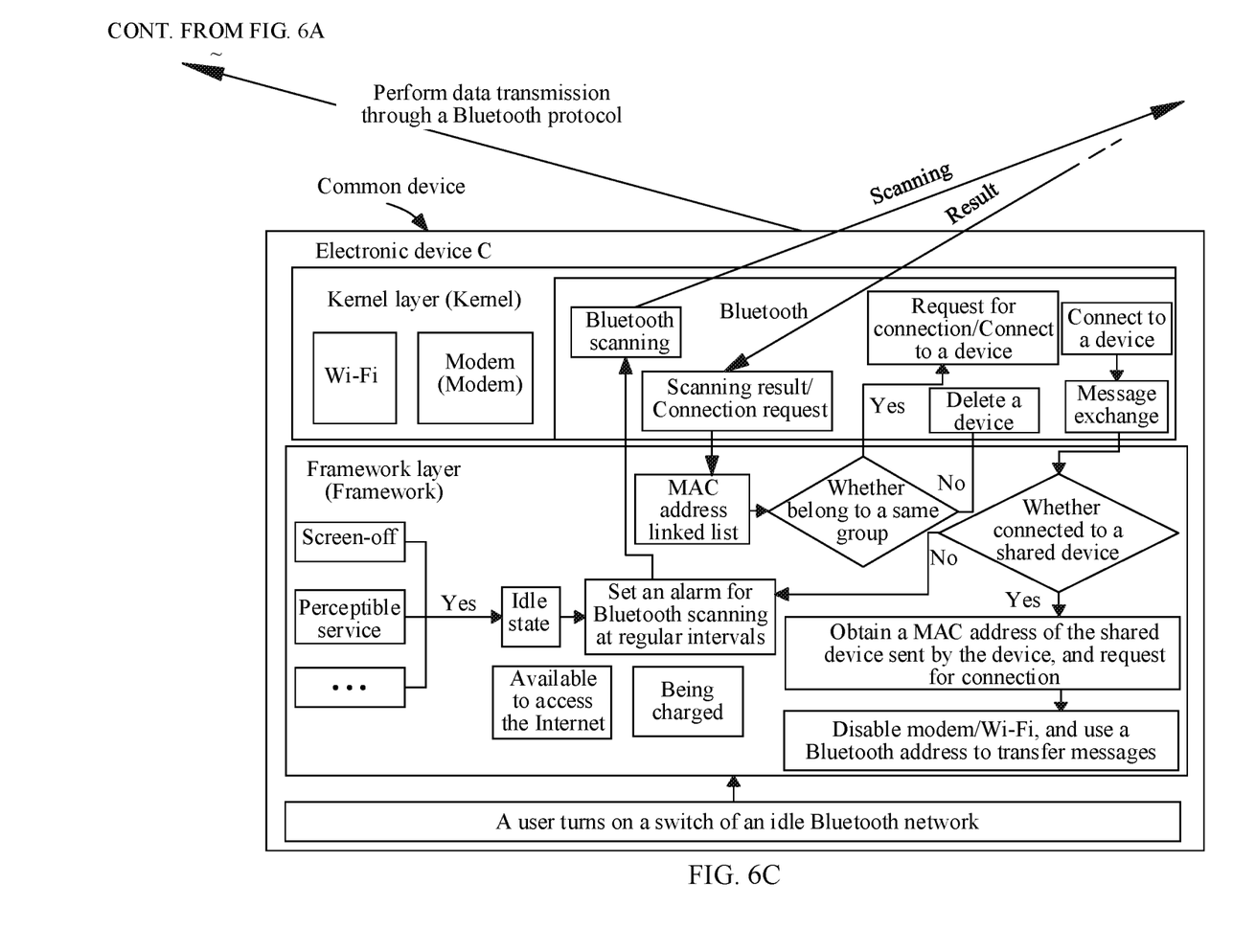

FIG. 6A to FIG. 6C are a diagram of an application scenario of a multi-device communication method according to an embodiment of this application. As shown in FIG. 6A to FIG. 6C, an electronic device A, an electronic device B, and an electronic device C are used as an example for description.

In an embodiment, the electronic device A may be a router, and the electronic device B and the electronic device C each may be a mobile phone or a tablet computer.

In a possible implementation scenario, the electronic device A is in an idle state, connectable to a network, and in a charging state. The electronic device B is in an idle state, connectable to a network, and in a non-charging state. The electronic device C is in an idle state, connectable to a network, and in a non-charging state. The electronic device A may serve as a shared device, and the electronic device B and the electronic device C each may serve as a common device.

After entering the idle state, the electronic device B may perform Bluetooth scanning periodically. For example, the electronic device B may perform Bluetooth scanning every 5 minutes within half an hour after entering the idle state, or the electronic device B may perform Bluetooth scanning every 30 minutes half an hour later after entering the idle state. The electronic device B may send a connection request based on a scanning result.

For example, if the electronic device B finds the electronic device A through Bluetooth scanning, it may be determined, based on a MAC address of the electronic device A, whether the electronic device A and the electronic device B belong to a same group. If the electronic device A and the electronic device B do not belong to the same group, the electronic device A is deleted from a Bluetooth list of the electronic device B. If the electronic device A and the electronic device B belong to the same group, the electronic device B sends the connection request to the electronic device A. After receiving the connection request of the electronic device B, the electronic device A determines whether a MAC address of the electronic device B belongs to a same group account of the electronic device A. If the MAC address of the electronic device B does not belong to the same group account of the electronic device A, the electronic device B is deleted from a Bluetooth list of the electronic device A. If the MAC address of the electronic device B belongs to the same group account of the electronic device A, the connection is accepted. After the electronic device A establishes a Bluetooth connection to the electronic device B, message exchange may be performed between the electronic device A and the electronic device B. The electronic device A sends a message to the electronic device B through Bluetooth, to notify the electronic device B. In this case, the electronic device A is a shared device.

To be specific, after the electronic device B establishes a Bluetooth connection to the electronic device A, the electronic device B may enable a Wi-Fi chip to be powered off, turn off a data service switch and a Wi-Fi switch, and perform data transmission through a Bluetooth protocol. A cloud server 300 receives a disconnection notification of the electronic device B, and blocks a to-be-sent message. When the electronic device B is connected to the electronic device A, the electronic device A receives a device ID and a port number of the electronic device B, and the electronic device A sends related information of the electronic device B to the cloud server 300, and notifies the cloud server 300 of information indicating that the electronic device B is connected. In this case, after receiving a connection message, the cloud server 300 resends a message that is blocked or unsuccessfully sent.

If the electronic device B finds the electronic device C through Bluetooth scanning, the electronic device B determines whether a MAC address of the electronic device C belongs to a same group account of the electronic device B. If the MAC address of the electronic device C does not belong to the same group account of the electronic device B, the electronic device C is deleted from the Bluetooth list of the electronic device B. If the MAC address of the electronic device C belongs to the same group account of the electronic device B, a connection request of the electronic device C is accepted. After the electronic device B establishes a Bluetooth connection to the electronic device C, the electronic device B communicates with the electronic device C. If neither the electronic device B nor the electronic device C has a condition to be a shared device, and neither the electronic device B nor the electronic device C has a shared device, Bluetooth scanning is performed at a preset interval. If neither the electronic device B nor the electronic device C has a condition to be a shared device, but the electronic device B finds a shared device (for example, the electronic device A), the electronic device B sends the MAC address of the electronic device A to the electronic device C, and the electronic device C sends the connection request to the electronic device A.

In a possible implementation, when any one of the electronic devices (for example, the electronic device B) encounters at least one of the following: moving, screen-on, being charged, or a perceptible service (an alarm or a phone call), or a shared device has an abnormal disconnection, the framework layer first determines a specific service type. If a current delayed message delivery time reaches a preset threshold, Bluetooth may continue to be used; or if a message is not delivered in time for three consecutive times, the electronic device disconnects the Bluetooth connection, restores the state of an original data service and a Wi-Fi switch and an original network connection, and power on the Wi-Fi chip and a modem module.

Figure 7:
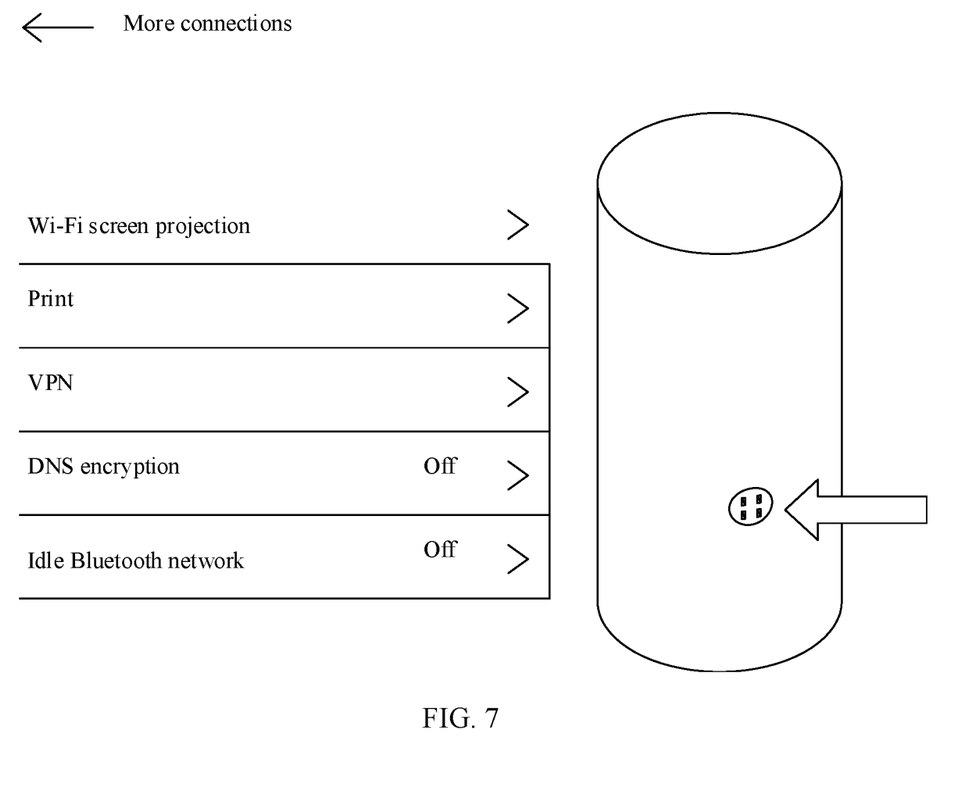
FIG. 7 is a diagram of an application state of a multi-device communication method according to an embodiment of this application.

As shown in FIG. 7, a switch may be disposed in an electronic device in an embodiment of this application. Therefore, a user may trigger, via the switch, whether to enter a power-saving mode of multi-device communication in embodiments of this application. In other words, if the user may choose to enable the power-saving function or disable the power-saving function of the electronic device, user experience may be improved.

Therefore, in the multi-device communication method provided in embodiments of this application, an application scenario of the electronic device may be identified for a multi-device communication system. In a possible implementation scenario, a network communication function of a shared device is used as an agent for a network transmission function of all devices in the entire communication system. The shared device may transmit a corresponding data packet and information about a scanned device to the electronic device through Bluetooth, and turn off a data service switch and a Wi-Fi switch of the electronic device other than the shared device, to ensure that a modem and a Wi-Fi chip are powered off. Therefore, according to embodiments of this application, power consumption of the electronic device can be reduced, to save power, and normal data transmission between electronic devices can be ensured through Bluetooth.

Figure 8:
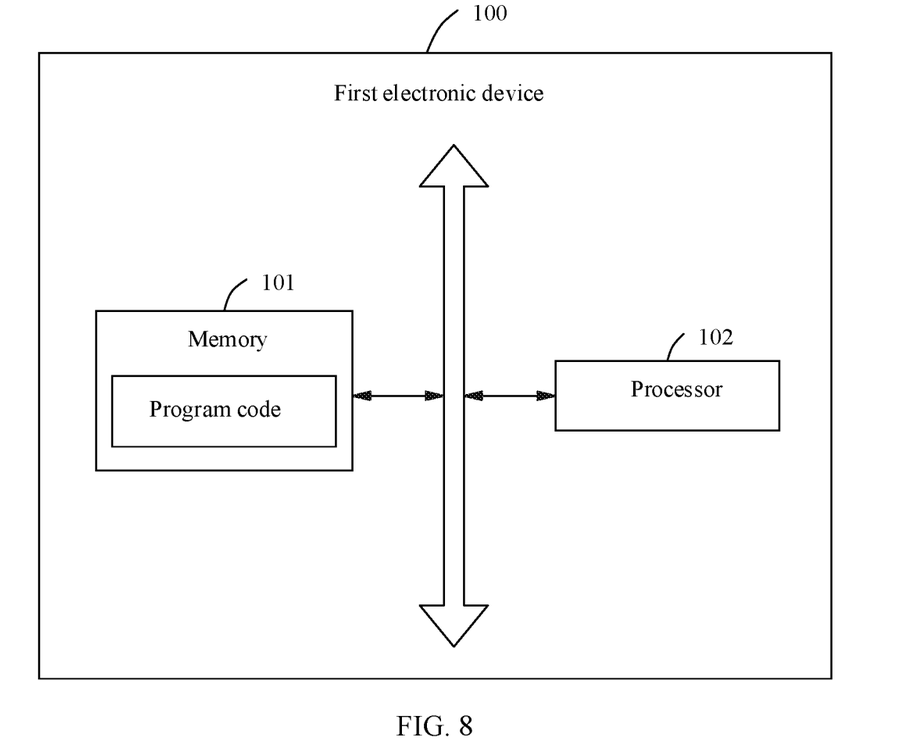
FIG. 8 is a schematic diagram of a first electronic device according to an embodiment of this application.

FIG. 8 is a schematic diagram of a structure of a first electronic device according to an embodiment of this application. In an embodiment, the first electronic device 100 includes a memory 101 and at least one processor 102.

A person skilled in the art should understand that, the structure of the first electronic device shown in FIG. 8 does not constitute a limitation on embodiments of this application. The first electronic device 100 may further include more or less hardware or software than those shown in FIG. 8, or have different component arrangements.

In some embodiments, the first electronic device 100 includes a terminal that can automatically perform numerical calculation and/or information processing according to a preset or pre-stored instruction. Hardware of the terminal includes but is not limited to a microprocessor, an application specific integrated circuit, a field-programmable gate array, a digital processor, an embedded device, and the like.

It should be noted that the first electronic device 100 is merely an example, and another existing electronic product or electronic product possibly appearing in future that is applicable to this application should also fall within the protection scope of this application.

In some embodiments, the memory 101 is configured to store program code and various data. The memory 101 may include a read-only memory (ROM), a random access memory (RAM), a programmable read-only memory ( ), an erasable programmable read-only memory (EPROM), a one-time programmable read-only memory (OTPROM), an electrically-erasable programmable read-only memory (EEPROM), a compact disc read-only memory (CD-ROM), or another optical disk memory, a magnetic disk memory, a magnetic tape memory, or any other computer-readable medium that can be used to carry or store data.

In some embodiments, the at least one processor 102 may include an integrated circuit. For example, the at least one processor 102 may include a single packaged integrated circuit, or may include a plurality of packaged integrated circuits that have a same function or different functions, including one or more central processing units (CPUs), a microprocessor, a digital processing chip, a graphics processing unit, and a combination of various control chips. The at least one processor 102 is a control unit of the first electronic device, and executes various functions of the first electronic device 100 and performs data processing by running or executing a program or a module stored in the memory 101 and invoking data stored in the memory 101, for example, executing a multi-device communication function.

The foregoing integrated unit implemented in a form of a software functional module may be stored in a computer-readable storage medium. The software functional module is stored in a storage medium and includes several instructions for instructing a computer device (which may be a personal computer, a terminal, or a network device) or a processor to perform a part of the method described in embodiments of this application.

The memory 101 stores program code, and the at least one processor 102 may invoke the program code stored in the memory 101 to execute a related function. In an embodiment of this application, the memory 101 stores a plurality of instructions, and the plurality of instructions are executed by the at least one processor 102 to implement a multi-device communication method. Specifically, for a specific method for implementing the foregoing instruction by the at least one processor 102, refer to descriptions of related steps in the embodiment corresponding to FIG. 2. Details are not described herein again.

Figure 9:
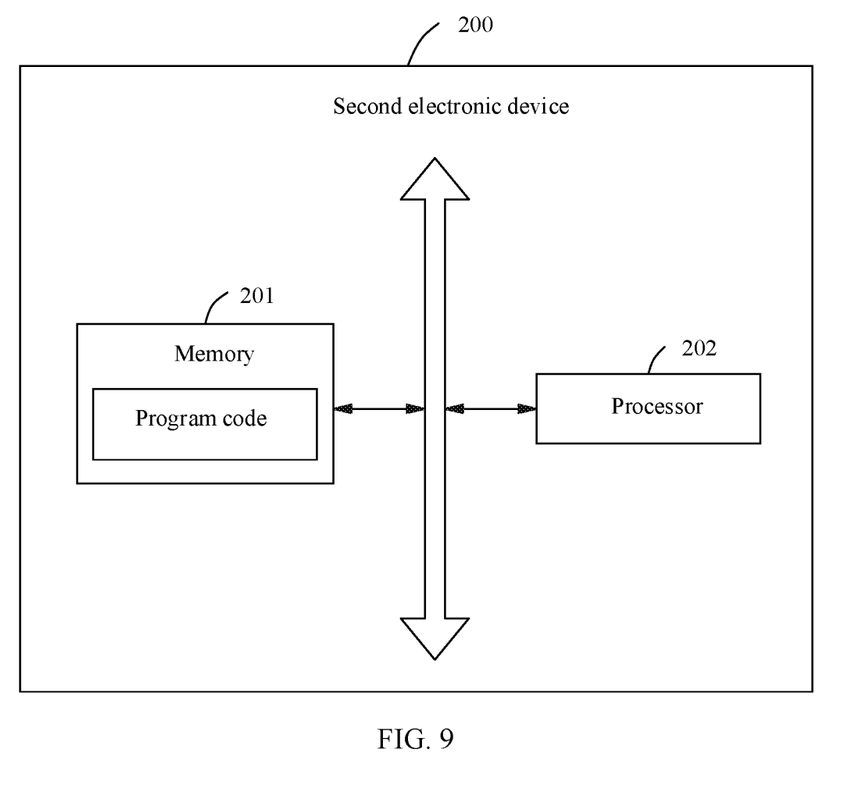
FIG. 9 is a schematic diagram of a second electronic device according to an embodiment of this application.

FIG. 9 is a schematic diagram of a structure of a second electronic device according to an embodiment of this application. In an embodiment, the second electronic device 200 includes a memory 201 and at least one processor 202.

A person skilled in the art should understand that, the structure of the second electronic device shown in FIG. 8 does not constitute a limitation on embodiments of this application. The second electronic device 200 may further include more or less hardware or software than those shown in FIG. 9, or have different component arrangements.

In some embodiments, the second electronic device 200 includes a terminal that can automatically perform numerical calculation and/or information processing according to a preset or pre-stored instruction. Hardware of the terminal includes but is not limited to a microprocessor, an application specific integrated circuit, a field-programmable gate array, a digital processor, an embedded device, and the like.

It should be noted that the second electronic device 200 is merely an example, and another existing electronic product or electronic product possibly appearing in future that is applicable to this application should also fall within the protection scope of this application.

In some embodiments, the memory 201 is configured to store program code and various data. The memory 201 may include a read-only memory (ROM), a random access memory (RAM), a programmable read-only memory (PROM), an erasable programmable read-only memory (EPROM), a one-time programmable read-only memory (OTPROM), an electrically-erasable programmable read-only memory (EEPROM), a compact disc read-only memory (CD-ROM), or another optical disk memory, a magnetic disk memory, a magnetic tape memory, or any other computer-readable medium that can be used to carry or store data.

In some embodiments, the at least one processor 202 may include an integrated circuit. For example, the at least one processor 202 may include a single packaged integrated circuit, or may include a plurality of packaged integrated circuits that have a same function or different functions, including one or more central processing units (CPUs), a microprocessor, a digital processing chip, a graphics processing unit, and a combination of various control chips. The at least one processor 202 is a control unit of the second electronic device, and executes various functions of the second electronic device 200 and performs data processing by running or executing a program or a module stored in the memory 201 and invoking data stored in the memory 201, for example, executing a multi-device communication function.

The foregoing integrated unit implemented in a form of a software functional module may be stored in a computer-readable storage medium. The software functional module is stored in a storage medium and includes several instructions for instructing a computer device (which may be a personal computer, a terminal, or a network device) or a processor to perform a part of the method described in embodiments of this application.

The memory 201 stores program code, and the at least one processor 202 may invoke the program code stored in the memory 201 to execute a related function. In an embodiment of this application, the memory 201 stores a plurality of instructions, and the plurality of instructions are executed by the at least one processor 202 to implement a multi-device communication method. Specifically, for a specific method for implementing the foregoing instruction by the at least one processor 202, refer to descriptions of related steps in the embodiment corresponding to FIG. 4. Details are not described herein again.

It is clear that, for a person skilled in the art, this application is not limited to details of the foregoing example embodiments, and this application can be implemented in another specific form without departing from the spirit or basic features of this application. Therefore, appropriate modifications and variations made to the foregoing embodiments shall fall within the protection scope of this application provided that the modifications and variations fall within the essential spirit of this application.

What is claimed is:

1. A multi-device communication method, applied to a first electronic device, the method comprising:
   scanning an electronic device around the first electronic device through Bluetooth in response to the first electronic device being connectable to a network and being in a charging state;
   determining, based on the scanning operation, a second electronic device;
   based on the second electronic device and the first electronic device belonging to a same group, determining whether the second electronic device has a shared device;
   determining, in response to the second electronic device having no shared device, the first electronic device as a shared device, and
   establishing a Bluetooth connection to the second electronic device.

2. The multi-device communication method according to claim 1, further comprising:
   in response to the second electronic device having a shared device, connecting to the shared device through Bluetooth.

3. The multi-device communication method according to claim 1, wherein before scanning the electronic device around the first electronic device through Bluetooth, the method further comprises:
   determining, based on state information of the first electronic device, whether the first electronic device enters an idle state;
   obtaining device information of the first electronic device in response to the first electronic device entering the idle state; and
   determining, based on the device information, whether the first electronic device is connectable to the network and is in the charging state.

4. The multi-device communication method according to claim 3, wherein
   the state information of the first electronic device comprises at least one of the following: screen-off duration, a perceptible service, a persistent connection state, a device occlusion state, and a movement state.

5. The multi-device communication method according to claim 1, wherein after scanning the electronic device around the first electronic device through Bluetooth, the method further comprises:
   obtaining a media access control address of the second electronic device; and
   determining, based on the media access control address of the second electronic device, whether the second electronic device and the first electronic device belong to the same group.

6. A multi-device communication method, applied to a second electronic device, the method comprising:
   scanning an electronic device around the second electronic device through Bluetooth in response to the second electronic device requesting to connect to a network and being in a non-charging state;
   determining, based on the scanning operation, a first electronic device;
   based on the first electronic device and the second electronic device belonging to a same group, determining whether the first electronic device has a shared device; and establishing, in response to the first electronic device having a shared device, a Bluetooth connection to the shared device.

7. The multi-device communication method according to claim 6, further comprising:
in response to the second electronic device establishing the Bluetooth connection to the shared device, performing data transmission through a Bluetooth protocol.

8. The multi-device communication method according to claim 6, wherein before scanning the electronic device around the second electronic device through Bluetooth, the method further comprises:
determining, based on state information of the second electronic device, whether the second electronic device enters an idle state;
obtaining device information of the second electronic device in response to the second electronic device entering the idle state; and
determining, based on the device information, whether the second electronic device requests to connect to the network and is in the non-charging state.

9. The multi-device communication method according to claim 8, wherein
the state information of the second electronic device comprises at least one of the following: screen-off duration, a perceptible service, a persistent connection state, a device occlusion state, and a movement state.

10. The multi-device communication method according to claim 6, wherein after scanning the electronic device around the second electronic device through Bluetooth, the method further comprises:
obtaining a media access control address of the first electronic device; and
determining, based on the media access control address of the first electronic device, whether the first electronic device and the second electronic device belong to the same group.

11. The multi-device communication method according to claim 6, further comprising:
based on a time period in which the second electronic device is in the idle state being less than a first time period, scanning the electronic device around the second electronic device at an interval of a second time period.

12. The multi-device communication method according to claim 11, further comprising:
based on the time period in which the second electronic device is in the idle state being greater than or equal to the first time period, scanning the electronic device around the second electronic device at an interval of a third time period, wherein the third time period is greater than the second time period.

13. An electronic device, comprising a memory and a processor, wherein the processor is configured to execute a computer program stored in the memory, to cause the electronic device to perform the following operations comprising:
scanning a first electronic device around the electronic device through Bluetooth in response to the electronic device requesting to connect to a network and being in a non-charging state;
based on the first electronic device and the electronic device belonging to a same group, determining whether the first electronic device has a shared device; and
establishing, in response to the first electronic device having a shared device, a Bluetooth connection to the shared device.

14. The electronic device according to claim 13, wherein the processor is further configured to execute the computer program and to cause the electronic device to perform:
in response to the electronic device establishing the Bluetooth connection to the shared device, performing data transmission through a Bluetooth protocol.

15. The electronic device according to claim 13, wherein before scanning the first electronic device around the electronic device through Bluetooth, the processor is further configured to execute the computer program and to cause the electronic device to perform:
determining, based on state information of the electronic device, whether the electronic device enters an idle state;
obtaining device information of the electronic device in response to the electronic device entering the idle state; and
determining, based on the device information, whether the electronic device requests to connect to the network and is in the non-charging state.

16. The electronic device according to claim 15, wherein the state information of the electronic device comprises at least one of the following: screen-off duration, a perceptible service, a persistent connection state, a device occlusion state, and a movement state.

17. The electronic device according to claim 13, wherein after scanning the first electronic device around the electronic device through Bluetooth, the processor is further configured to execute the computer program and to cause the electronic device to perform:
obtaining a media access control address of the first electronic device; and
determining, based on the media access control address of the first electronic device, whether the first electronic device and the electronic device belong to the same group.

18. The electronic device according to claim 13, wherein the processor is further configured to execute the computer program and to cause the electronic device to perform:
based on a time period in which the electronic device is in the idle state being less than a first time period, scanning the first electronic device around the electronic device at an interval of a second time period.

19. The electronic device according to claim 18, wherein the processor is further configured to execute the computer program and to cause the electronic device to perform:
based on the time period in which the electronic device is in the idle state being greater than or equal to the first time period, scanning the first electronic device around the electronic device at an interval of a third time period, wherein the third time period is greater than the second time period.

* * * * *